(12) United States Patent
Kohda et al.

(10) Patent No.: US 11,144,489 B2
(45) Date of Patent: *Oct. 12, 2021

(54) ARBITRATION OF DATA TRANSFER REQUESTS

(71) Applicant: INTERNATIONAL BUSINESS MACHINES CORPORATION, Armonk, NY (US)

(72) Inventors: Yasuteru Kohda, Kanagawa-ken (JP); Nobuyuki Ohba, Sendai (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,396

(22) Filed: May 29, 2019

(65) Prior Publication Data
US 2019/0278727 A1    Sep. 12, 2019

Related U.S. Application Data

(63) Continuation of application No. 15/357,688, filed on Nov. 21, 2016, now Pat. No. 10,372,640.

(51) Int. Cl.
*H04L 29/08* (2006.01)
*G06F 13/364* (2006.01)
*H04L 12/803* (2013.01)

(52) U.S. Cl.
CPC .......... *G06F 13/364* (2013.01); *H04L 47/125* (2013.01); *H04L 67/1002* (2013.01); *H04L 67/34* (2013.01)

(58) Field of Classification Search
CPC .............. G06F 13/364; H04L 67/1002; H04L 47/125; H04L 67/34
See application file for complete search history.

(56) References Cited

U.S. PATENT DOCUMENTS

| 5,541,916 A | 7/1996 | Nobuyuki |
| 5,892,766 A * | 4/1999 | Wicki ..................... H04L 47/10 370/412 |

(Continued)

FOREIGN PATENT DOCUMENTS

EP    1 078 498 B1    2/2001

OTHER PUBLICATIONS

Jeloka, S., et al., "Hi-Rise: A High-Radix Switch for 3D Integration with Single-Cycle Arbitration," 2014 47th Annual IEEE/ACM International Symposium on Microarchitecture, Dec. 13-17, 2014, (pp. 471-483).

(Continued)

*Primary Examiner* — Shirley X Zhang
(74) *Attorney, Agent, or Firm* — Tutunjian & Bitetto, P.C.; Randall Bluestone

(57) ABSTRACT

A method for arbitrating data transfer requests from a plurality of nodes includes specifying one or more nodes among the plurality of nodes, the one or more nodes satisfying a predetermined condition, and selecting, if two or more nodes are specified among the plurality of nodes, one node from the two or more nodes using priority information, the priority information indicating correspondence between the plurality of nodes and a plurality of priorities each assigned to one of the plurality of nodes, the correspondence changing so that the plurality of priorities are assigned equally to each of the plurality of nodes and high and low relations appear equally between pairs of priorities each assigned to a pair of nodes of the plurality of nodes.

18 Claims, 9 Drawing Sheets

(56) References Cited

U.S. PATENT DOCUMENTS

| | | | |
|---|---|---|---|
| 6,085,276 | A | 7/2000 | VanDoren et al. |
| 6,480,502 | B1 | 11/2002 | Abadi et al. |
| 6,667,984 | B1 | 12/2003 | Chao et al. |
| 9,100,323 | B1 | 8/2015 | Sindhu et al. |
| 2006/0098604 | A1 | 5/2006 | Flammer, III et al. |
| 2007/0121630 | A1 | 5/2007 | Stephen et al. |
| 2008/0069130 | A1* | 3/2008 | Jensen .................. H04L 49/254 370/412 |
| 2010/0002716 | A1 | 1/2010 | Naven et al. |
| 2011/0208887 | A1 | 8/2011 | Chen et al. |
| 2015/0139653 | A1 | 5/2015 | Binkert et al. |
| 2015/0188848 | A1 | 7/2015 | Tran et al. |

OTHER PUBLICATIONS

Chen, K.F., et al., "Fast and noniterative scheduling in input-queued switches: Supporting QoS," Computer Communications, vol. 32, Issue 5, Mar. 27, 2009. (pp. 834-846).

Office Action dated May 2, 2019 for U.S. Appl. No. 15/427,188, 48 pages.

List of IBM Patents or Patent Applications Treated as Related dated May 29, 2019, 2 pages.

* cited by examiner

ARBITRATION OF DATA TRANSFER REQUESTS

BACKGROUND

Technical Field

The present invention relates to arbitration of data transfer requests from a plurality of nodes.

Related Art

Recently, various techniques have been known regarding arbitration of data transfer requests from a plurality of nodes.

SUMMARY

According to an embodiment of the present invention, a method for arbitrating data transfer requests from a plurality of nodes is provided. The method includes specifying one or more nodes among the plurality of nodes. The method further includes selecting, if two or more nodes are specified among the plurality of nodes, one node from the two or more nodes using priority information. The priority information indicates correspondence between the plurality of nodes and a plurality of priorities each assigned to one of the plurality of nodes. The correspondence changes so that the plurality of priorities are assigned equally to each of the plurality of nodes and high and low relations of priority appear equally between pairs of priorities each assigned to a pair of nodes of the plurality of nodes.

According to another embodiment of the present invention, an apparatus for arbitrating data transfer requests from a plurality of nodes is provided. The apparatus includes a processor and a memory coupled to the processor. The memory includes program instructions. The program instructions are executable by the processor to cause the processor to specify one or more nodes among the plurality of nodes. The one or more nodes satisfy a predetermined condition. The program instructions are executable by the processor to further cause the processor to select, if two or more nodes are specified among the plurality of nodes, one node from the two or more nodes using priority information. The priority information indicates correspondence between the plurality of nodes and a plurality of priorities each assigned to one of the plurality of nodes. The correspondence changes so that the plurality of priorities are assigned equally to each of the plurality of nodes and high and low relations of priority appear equally between pairs of priorities each assigned to a pair of nodes of the plurality of nodes.

According to yet another embodiment of the present invention, a computer program product for arbitrating data transfer requests from a plurality of nodes is provided. The computer program product includes a non-transitory computer readable storage medium having program instructions embodied with the computer readable storage medium is provided. The program instructions are executable by a computer to cause the computer to specify one or more nodes among the plurality of nodes. The one or more nodes satisfy a predetermined condition. The program instructions are executable by a computer to further cause the computer to select, if two or more nodes are specified among the plurality of nodes, one node from the two or more nodes using priority information. The priority information indicates correspondence between the plurality of nodes and a plurality of priorities each assigned to one of the plurality of nodes. The correspondence changes so that the plurality of priorities are assigned equally to each of the plurality of nodes and high and low relations appear equally between pairs of priorities each assigned to a pair of nodes of the plurality of nodes.

DETAILED DESCRIPTION

Hereinafter, exemplary embodiments of the present invention will be described in detail with reference to the attached drawings.

It should be noted that the present invention is not limited to these exemplary embodiments to be given below and may be implemented with various modifications within the scope of the present invention. In addition, the drawings used herein are for purposes of illustration, and may not show actual dimensions.

Figure 1A:
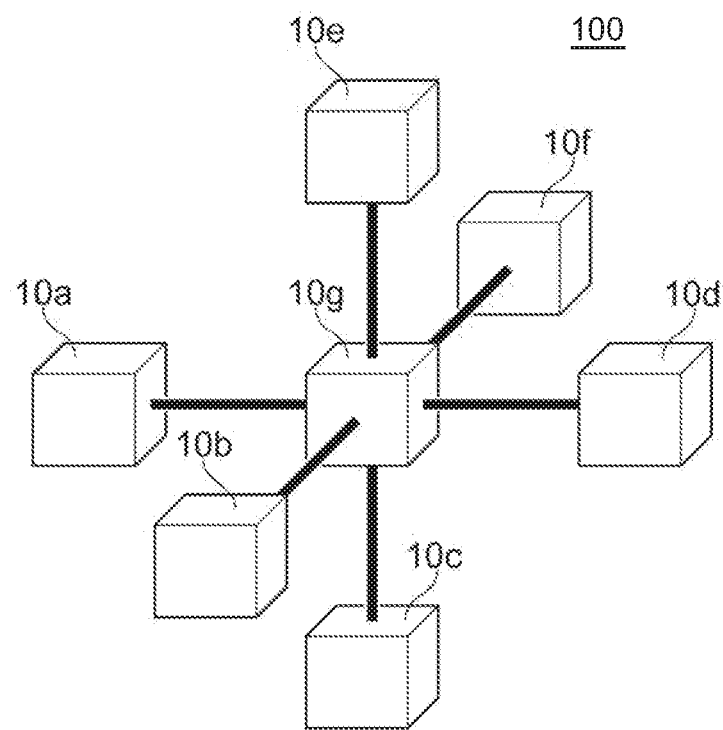
FIGS. 1A and 1B depict schematic diagrams indicating a background of exemplary embodiments of the present invention.
Figure 1B:
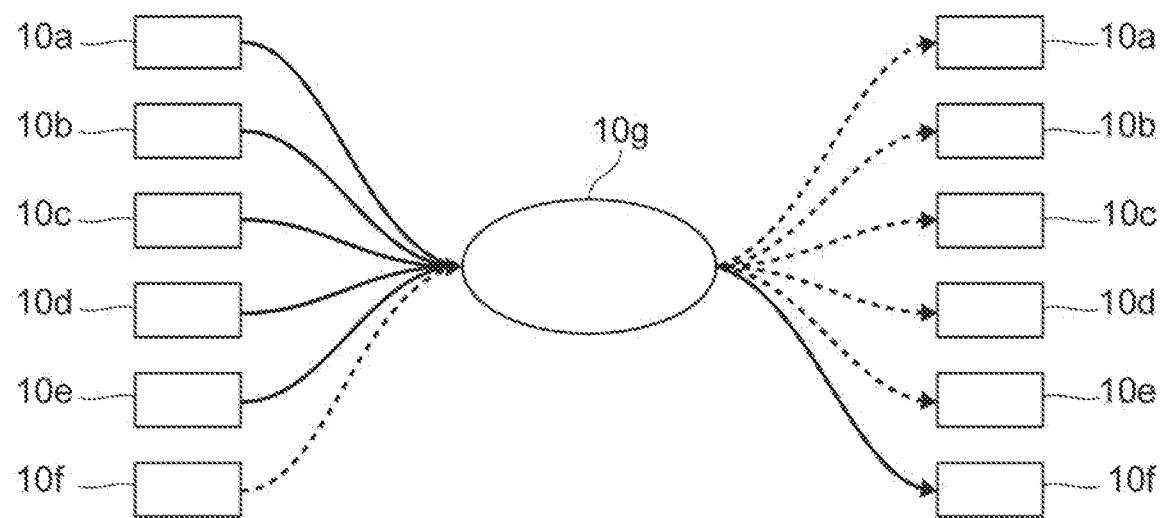

Referring to FIGS. 1A and 1B, schematic diagrams indicating a background of the exemplary embodiments are shown.

FIG. 1A shows a part of a mesh-based network 100 according to the exemplary embodiments. The mesh-based network 100 may be formed by connecting a plurality of nodes 10. In FIG. 1A, this part of the mesh-based network 100 is assumed to be formed by connecting nodes 10$a$, 10$b$, 10$c$, 10$d$, 10$e$, and 10$f$ to a node 10$g$ via links.

FIG. 1B shows a representation in which each of several source nodes requests to send a packet to one destination node. In FIG. 1B, this part of the mesh-based network is assumed to cause a situation in which each of the nodes 10$a$, 10$b$, 10$c$, 10$d$, and 10$e$ requests to send a packet to node 10$f$ via node 10$g$. In this case, node 10$g$ (in particular, a router in node 10$g$) may select one of the nodes 10$a$, 10$b$, 10$c$, 10$d$, and 10$e$, and forward the packet from the selected node to the node 10$f$. Note that, in some cases, the node 10$f$ may send a packet and any of the nodes 10$a$, 10$b$, 10$c$, 10$d$, and 10$e$ may receive the packet as indicated by broken lines in FIG. 1B.

In this example, the size of the packet to be forwarded to node 10$f$ is smaller than or equal to a credit value of the node 10$f$, where the credit value may indicate the size of the packet which can be received by the node 10$f$. If the size of the packet is larger than the credit value of the node 10$f$, a buffer overflow will be caused in the node 10$f$. Further, it is preferable to select the most congested node (e.g., the node that has the largest traffic amount) among the nodes 10a, 10b, 10c, 10d, and 10e. If two or more nodes are equally congested, it is preferable to select one of them in a fair manner.

In view of this, the exemplary embodiments provide a credit value-aware, traffic congestion-aware, and fair packet arbitration mechanism for the mesh-based network 100. Further, the packet arbitration mechanism is preferably required to be quick, and easy to be implemented in an application specific integrated circuit (ASIC) or a field-programmable gate array (FPGA).

Note that the term "traffic congestion-aware" is assumed to indicate a state of being "aware of traffic congestion of nodes" in the exemplary embodiments, although it may indicate a state of being "aware of traffic congestion of links connected to nodes". The traffic congestion of nodes and the traffic congestion of links connected to nodes serve as examples of the traffic congestion regarding nodes.

First, an exemplary embodiment will be described below.

Figure 2:
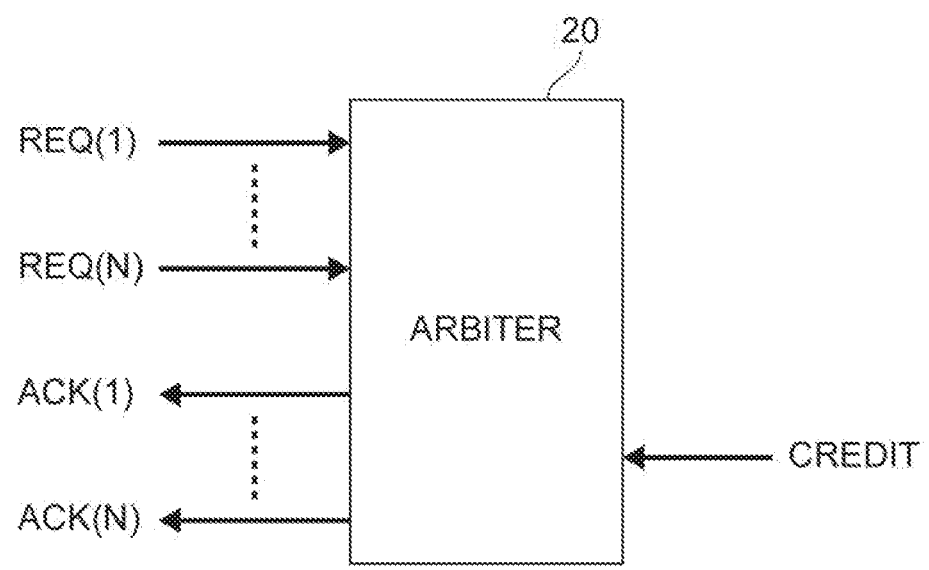
FIG. 2 depicts an arbiter according to an exemplary embodiment of the present invention.

Referring to FIG. 2, an arbiter 20 according to an exemplary embodiment is shown. In the example of FIG. 1, the node 10g may include the arbiter 20. As shown in FIG. 2, the arbiter 20 may receive signals REQ(1) to REQ(N) as input signals. Note that the signal REQ(i) is assumed to be received from the ith node (hereinafter referred to as the "node #i"), where i is 1 to N. The signal REQ(i) may be a request strobe signal accompanying information on a packet size corresponding to the signal REQ(i) and traffic congestion value of the node #i. The arbiter 20 may send signals ACK(1) to ACK(N) as output signals. Note that the signal ACK(i) is assumed to be sent to the node #i, where i is 1 to N. The signals ACK(1) to ACK(N) may be acknowledgements of the signals REQ(1) to REQ(N), respectively. Only one of the signals ACK(1) to ACK(N) may be returned in an active state. That is, the signals REQ(1) to REQ(N) are assumed to compete for an acknowledgement. Further, the arbiter 20 may receive a signal CREDIT as an input signal. The signal CREDIT may indicate a credit value of a destination node.

Figure 3:
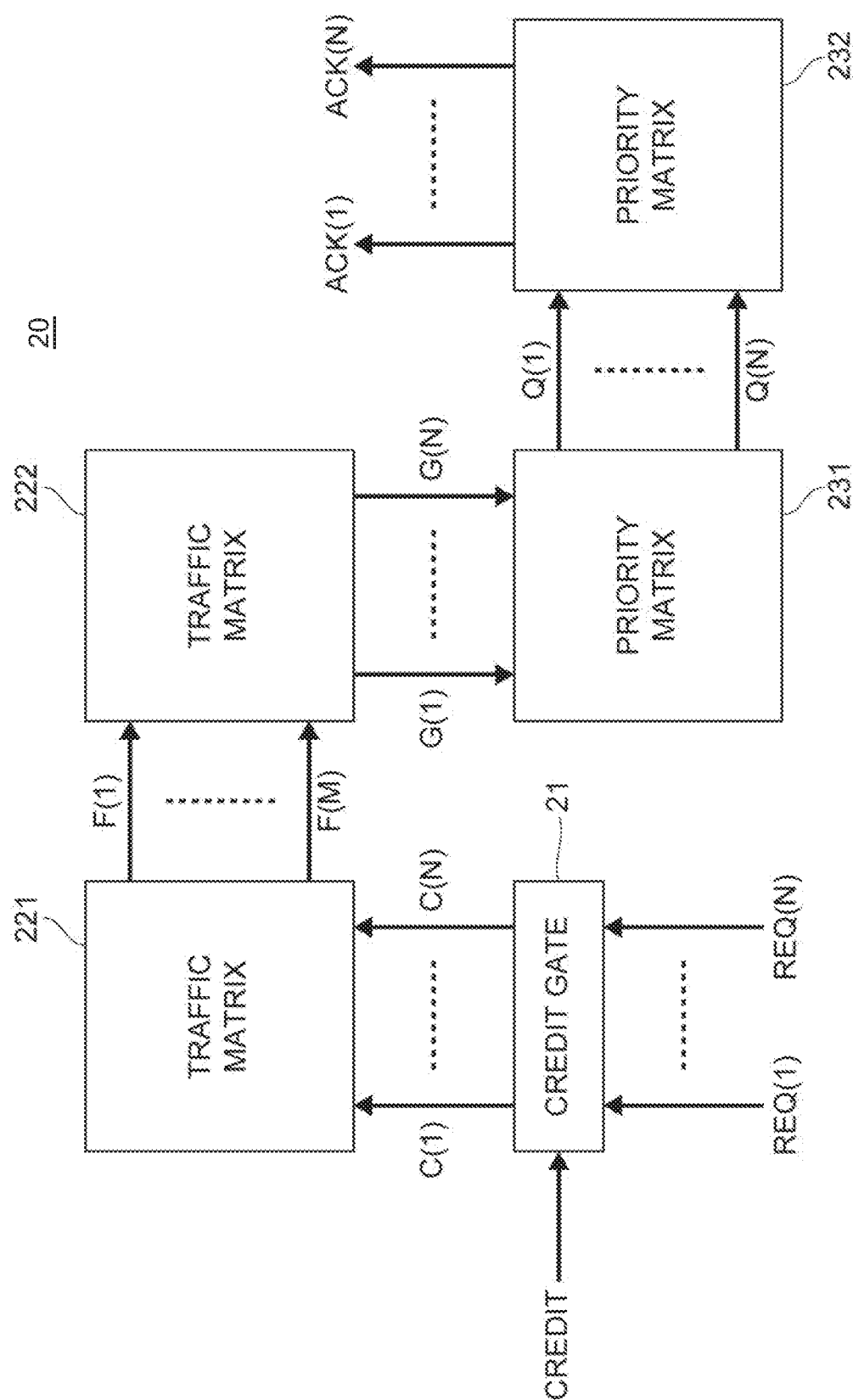
FIG. 3 depicts a block/flow diagram of the arbiter according to an exemplary embodiment of the present invention.

Referring to FIG. 3, a block/flow diagram of the arbiter 20 according to an exemplary embodiment is shown. As shown in FIG. 3, the arbiter 20 may include a credit gate 21, a traffic matrix 221, a traffic matrix 222, a priority matrix 231, and a priority matrix 232. The credit gate 21 may receive the signals REQ(1) to REQ(N) and the signal CREDIT shown in FIG. 2. The priority matrix 232 may send the signals ACK(1) to ACK(N) shown in FIG. 2. Hereinafter, an explanation about the structural elements of the arbiter 20 will be described.

Figure 4:
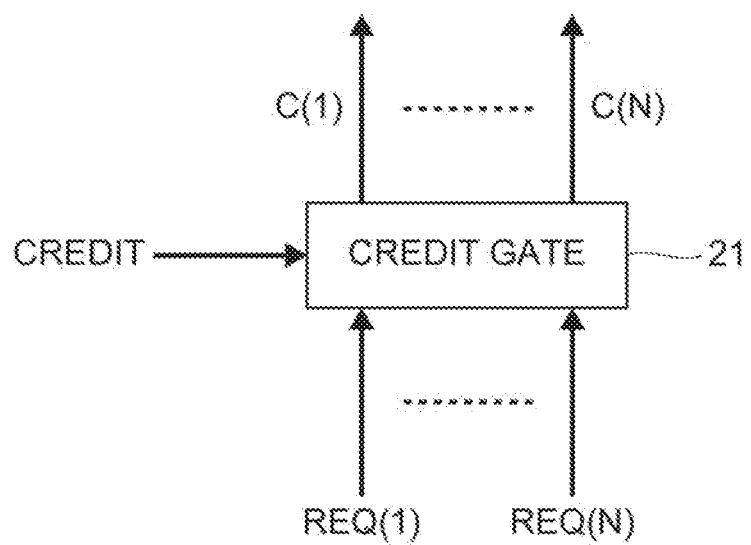
FIG. 4 depicts a credit gate according to an exemplary embodiment of the present invention.

Referring to FIG. 4, the credit gate 21 is shown according to the exemplary embodiment. The credit gate 21 may filter the signals REQ(1) to REQ(N) by referring to a credit value designated by the signal CREDIT. Specifically, the credit gate 21 may pass only signals accompanying the packet size smaller than or equal to the credit value, among the signals REQ(1) to REQ(N). For example, the credit gate 21 may output signals C(1) to C(N) obtained by the following formula:

$$1 \le i \le N$$
$$C(i) = \begin{cases} REQ(i) & \text{if } PS(i) \le \text{CREDIT} \\ 0 & \text{if } PS(i) > \text{CREDIT} \end{cases}$$

where PS(i) is the packet size of REQ(i)

Note that, if the arbiter 20 has not received the signal REQ(i), the signal REQ(i) may be set to zero, and thus the signal C(i) may be set to zero.

Figure 5:
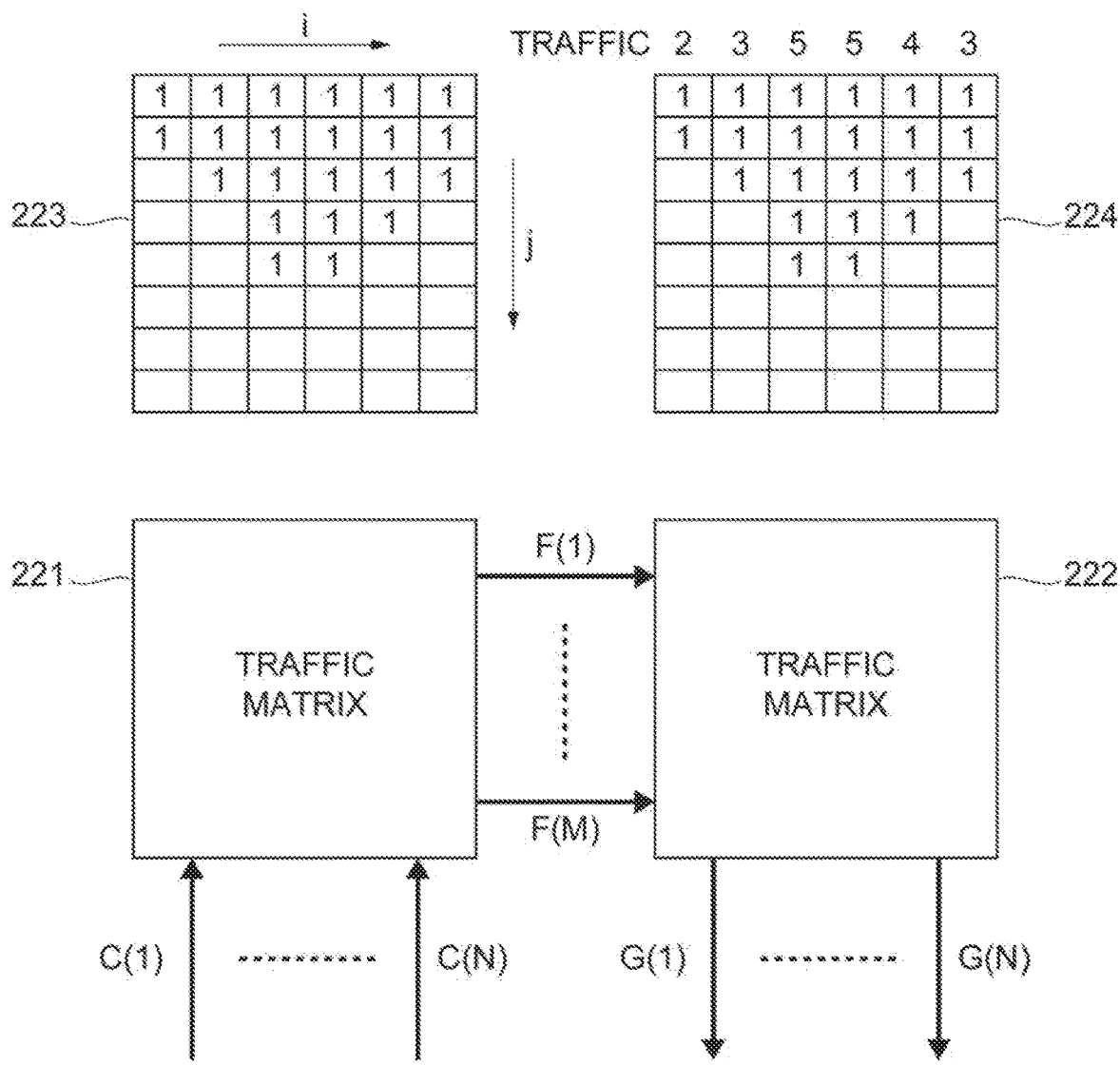
FIG. 5 depicts traffic matrixes according to an exemplary embodiment of the present invention.

Referring to FIG. 5, the traffic matrixes 221 and 222 are shown according to an exemplary embodiment. The traffic matrixes 221 and 222 may detect at least one most congested node (e.g., the node that has the largest traffic amount).

FIG. 5 further shows matrix contents 223 and 224 which are examples of contents of the traffic matrixes 221 and 222, respectively. As the matrix contents 223 and 224 suggest, the contents of the traffic matrixes 221 and 222 are always the same. Thus, the traffic matrixes 221 and 222 may be generated by duplicating one traffic matrix.

Assuming that the traffic matrix 221 (222) is denoted by T(i,j), the traffic matrix T(i,j) may be obtained, for example, by the following formula:

$$1 \le i \le N, 1 \le j \le M$$
$$T(i, j) = \begin{cases} 1 & \text{if } j \le \text{traffic}(i) \\ 0 & \text{otherwise} \end{cases}$$

Note that i may represent an index indicating a node, and j may represent an index indicating a traffic congestion value. Further, traffic(i) may represent a traffic congestion value of the node #i. Note that the traffic congestion value may indicate a level range in which actual traffic congestion falls.

In the matrix contents 223 and 224, N is assumed to be 6, and M is assumed to be 8. Further, the number of "1"s in the ith column from the left may represent a traffic congestion value of the node #i. For example, traffic congestion values of the node #1, #2, #3, #4, #5, and #6 are "2", "3", "5", "5", "4", and "3", respectively.

Next, an explanation is given about operations of the traffic matrixes 221 and 222.

The traffic matrix 221 may first generate a signal F(j), for example, by the following formula:

$$1 \le j \le M$$
$$F(j) = \bigcup_{i=1}^{N} C(i) \cdot T(i, j), \text{ where } \bigcup \text{ is logical } OR$$

By this calculation, it may be possible for the signals F(1) to F(M) to indicate, as a whole, the largest traffic congestion value. Assuming that all of the signals C(1) to C(N) are set to "1" and the traffic matrix T(i,j) shown in the figure is used, the signals F(1), F(2), F(3), F(4), F(5), F(6), F(7), and F(8) may be set to "1", "1", "1", "1", "1", "0", "0", and "0", respectively. This may indicate that the largest traffic congestion value is "5", which is the number of consecutive "1"s from F(1).

The traffic matrix 222 may subsequently generate a signal G(i), for example, by the following formula:

$$1 \le i \le N$$
$$G(i) = \prod_{j=1}^{M} \overline{F(j) \oplus T(i, j)}, \text{ where } \Pi \text{ is logical AND and } \oplus \text{ is } XOR$$

By this calculation, it may be possible for the signals G(1) to G(N) to indicate, as a whole, at least one most congested node. Since the signals F(1) to F(5) are set to "1" and the signals F(6) to F(8) are set to "0", assuming that the traffic matrix T(i,j) shown in the figure is used, the signals G(1), G(2), G(3), G(4), G(5), and G(6) may be set to "0", "0", "1", "1", "0", and "0", respectively. This may indicate that the at least one most congested node is the nodes #3 and #4, whose indexes correspond to the largest traffic congestion value.

Figure 6:
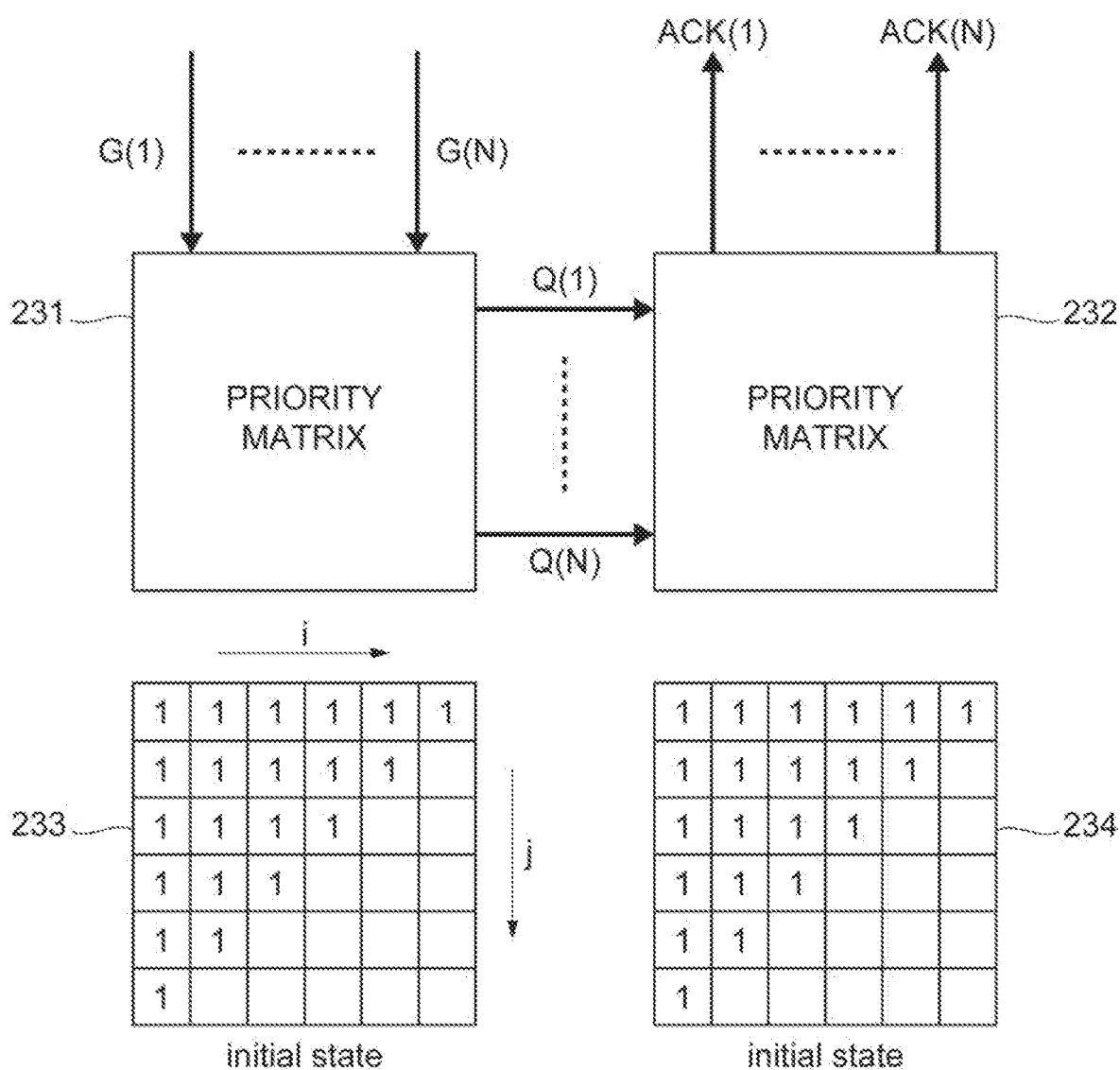
FIG. 6 depicts priority matrixes according to an exemplary embodiment of the present invention.

Referring to FIG. 6, the priority matrixes 231 and 232 are shown according to an exemplary embodiment. The priority matrixes 231 and 232 may select one of the at least one most congested node.

FIG. 6 further shows matrix contents 233 and 234 which are examples of contents of the priority matrixes 231 and 232, respectively. As the matrix contents 233 and 234 suggest, the contents of the priority matrixes 231 and 232 are always the same. Thus, the priority matrixes 231 and 232 may be generated by duplicating one priority matrix. Note that the priority matrix 231 (232) serves as one example of priority information.

Assuming that the priority matrix 231 (232) is denoted by P(i,j), an initial state of the priority matrix P(i,j) may be obtained, for example, by the following formula:

$$1 \leq i \leq N, 1 \leq j \leq N$$
$$\text{Initial state of } P(i, j) = \begin{cases} 1 & \text{if } (i+j) \leq (N+1) \\ 0 & \text{otherwise} \end{cases}$$

Note that i may represent an index indicating a node, and j may represent an index indicating a priority value. Further, the initial state of the priority matrix P(i,j) may represent a state before time transition of the priority matrix P(i,j) described later.

Also in the matrix contents 233 and 234, N is assumed to be 6. Further, the number of "1"s in the ith column from the left may represent a priority value of the node #i. For example, priority values of the node #1, #2, #3, #4, #5, and #6 are "6", "5", "4", "3", "2", and "1", respectively.

Next, an explanation is given about operations of the priority matrixes 231 and 232.

The priority matrix 231 may first generate a signal Q(j), for example, by the following formula:

$$1 \leq j \leq N$$
$$Q(j) = \bigcup_{i=1}^{N} G(i) \cdot P(i, j), \text{ where } \cup \text{ is logical OR}$$

By this calculation, it may be possible for the signals Q(1) to Q(N) to indicate, as a whole, the largest priority value among priority values of the at least one most congested node. Since the signals G(1) and G(2) are set to "0", the signals G(3) and G(4) are set to "1", and the signals G(5) and G(6) are set to "0", assuming that the priority matrix P(i,j) shown in the figure is used, the signals Q(1), Q(2), Q(3), Q(4), Q(5), and Q(6) may be set to "1", "1", "1", "1", "0", and "0", respectively. This may indicate that the largest priority value among priority values of the nodes #3 and #4 is "4", which is the number of consecutive "1"s from Q(1).

The priority matrix 232 may subsequently generate a signal ACK(i), for example, by the following formula:

$$1 \leq i \leq N$$
$$ACK(i) = \prod_{j=1}^{M} \overline{Q(j) \oplus P(i, j)}, \text{ where } \Pi \text{ is logical AND and } \oplus \text{ is XOR}$$

By this calculation, it may be possible for the signals ACK(1) to ACK(N) to indicate, as a whole, one node having the largest priority value. Since the signals Q(1) to Q(4) are set to "1" and the signals Q(5) to Q(6) are set to "0", assuming that the priority matrix P(i,j) shown in the figure is used, the signals ACK(1), ACK(2), ACK(3), ACK(4), ACK(5), and ACK(6) may be set to "0", "0", "1", "0", "0", and "0", respectively. This may indicate that one node having the largest priority value among the at least one most congested node is the node #3, whose index corresponds to the largest priority value.

Figure 7:
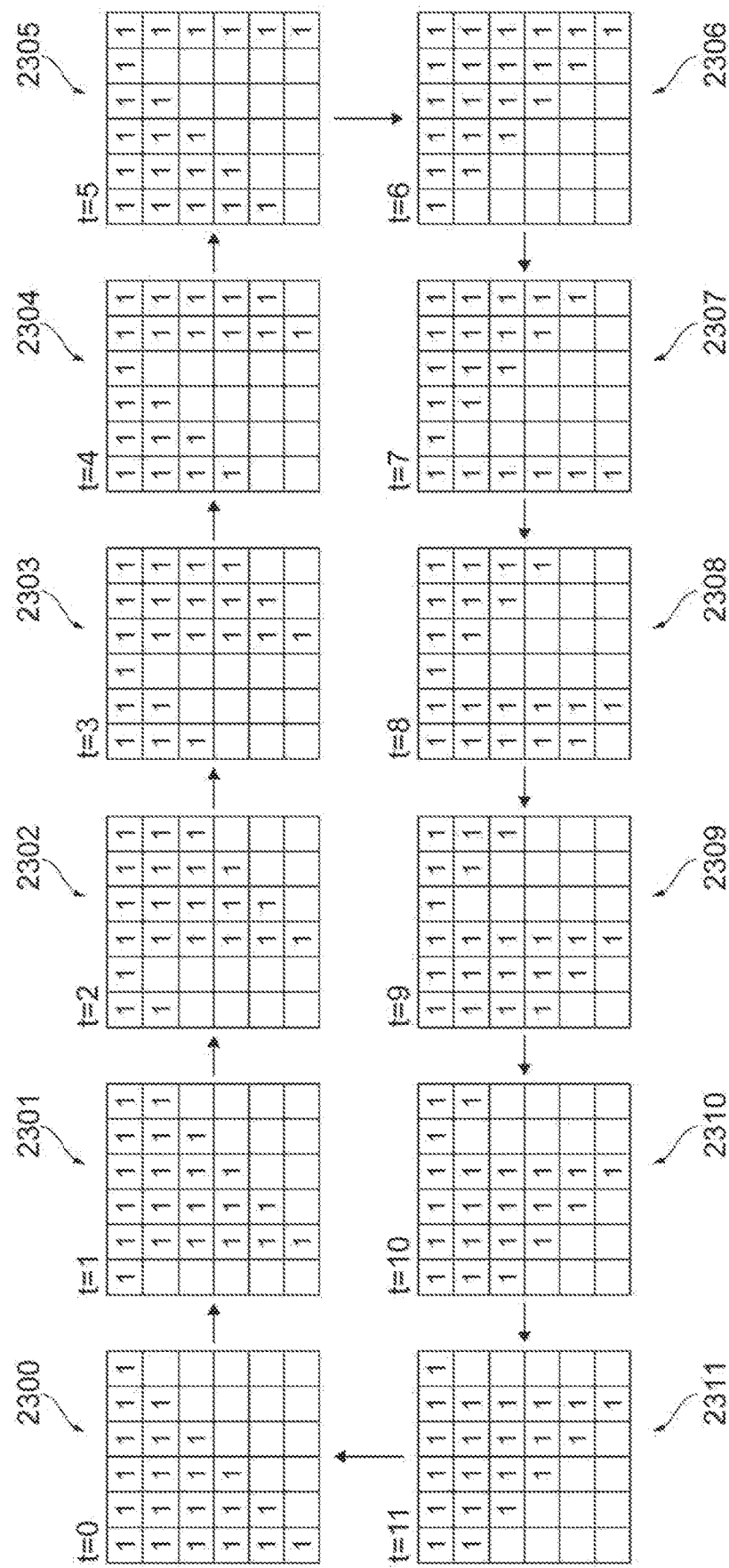
FIG. 7 depicts a schematic diagram indicating time transition of a priority matrix.

Referring to FIG. 7, a schematic diagram indicating time transition of the priority matrix 231 (232) is shown. In an exemplary embodiment, every time when the operation from receiving the signals REQ(1) to REQ(N) to sending the signals ACK(1) to ACK(N) is completed, the priority matrix 231 (232) is assumed to change its content. For example, time transition of the priority matrix P(i,j) may be obtained by the following formulae:

$$1 \leq i, j \leq N$$
$$t = 0 \to P(i, j) = \begin{cases} 1 & \text{if } (i+j) \leq (N+1) \\ 0 & \text{otherwise} \end{cases}$$
$$t = N \to P(i, j) = \begin{cases} 1 & \text{if } i \geq j \\ 0 & \text{otherwise} \end{cases}$$
$$t = \text{other time slot} \to \text{Rotate } P(i, j) \text{ to right}$$

Note that i may represent an index indicating a node, and j may represent an index indicating a priority value. Further, t may represent a time slot.

FIG. 7 shows matrix contents 2300 to 2311 which are examples of contents of the priority matrixes 231 (232) for time slots t=0 to t=11, respectively. Also in the matrix contents 2300 to 2311, N is assumed to be 6. Note that the matrix contents 2300 to 2311 serve as one example of a plurality of states. The matrix contents 2300 to 2305 serve as one example of a first state group, and the matrix contents 2306 to 2311 serve as one example of a second state group.

The first formula of the above formulae may be a formula for obtaining the matrix content 2300 for t=0. By this calculation, the matrix content 2300 may be formed so that the priority values "6" to "1" are assigned to one of the nodes #1 to #6 in this order. The priority values arranged from large to small in this way serve as one example of a plurality of priorities having a predetermined sequence. The assigning order from the node #1 to the node #6 serves as one example of a first order. That is, the matrix content 2300 serves as one example of a first state in which each of the plurality of priorities having the predetermined sequence is assigned to one of the plurality of nodes in the first order.

The second formula of the above formulae may be a formula for obtaining the matrix content 2306 for t=6. By this calculation, the matrix content 2306 may be formed so that the priority values "6" to "1" are assigned to one of the nodes #6 to #1 in this order. The priority values arranged from large to small in this way serve as one example of the plurality of priorities having the predetermined sequence, as described above. The assigning order from the node #6 to the node #1 serves as one example of a second order reverse to the first order. That is, the matrix content 2306 serves as one example of a second state in which each of the plurality of priorities having the predetermined sequence is assigned to one of the plurality of nodes in the second order.

The third formula of the above formulae may be a formula for obtaining the matrix contents 2301 to 2305 and 2307 to 2311 for t=1 to t=5 and t=7 to t=11. The matrix contents 2301 to 2305 may be obtained successively from the matrix content 2300 by shifting each of the nodes #1 to #6 by one node to the right. In this sense, the matrix contents 2301 to 2305 serve as one example of states obtained successively from the first state by shifting the one of the plurality of nodes by a predetermined number of nodes in the first order. The matrix contents 2307 to 2311 may be obtained successively from the matrix content 2306 by shifting each of nodes #1 to #6 by one node to the right. In this sense, the matrix contents 2307 to 2311 serve as one example of states obtained successively from the second state by shifting the one of the plurality of nodes by the predetermined number of nodes in the first order.

In FIG. 7, the priority matrix 231 (232) may change its content so that the content is sequentially transitioned from the matrix content 2300 to the matrix content 2311. This transition is performed so that the priority values "1" to "6" are assigned equally to each of the nodes #1 to #6. This transition is performed also so that high and low relations appear equally between pairs of priority values "1" to "6" each assigned to a pair of the nodes #1 to #6. For example, a priority value assigned to the node #2 is larger than a priority value assigned to the node #3 in five matrix contents of the matrix contents 2300 to 2305, and a priority value assigned to the node #3 is larger than a priority value assigned to the node #2 in one matrix content of the matrix contents 2300 to 2305. On the other hand, a priority value assigned to the node #2 is larger than a priority value assigned to the node #3 in one matrix content of the matrix contents 2306 to 2311, and a priority value assigned to the node #3 is larger than a priority value assigned to the node #2 in five matrix contents of the matrix contents 2306 to 2311. Thus, high and low relations appear equally between priority values each assigned to the nodes #2 and #3.

Figure 8:
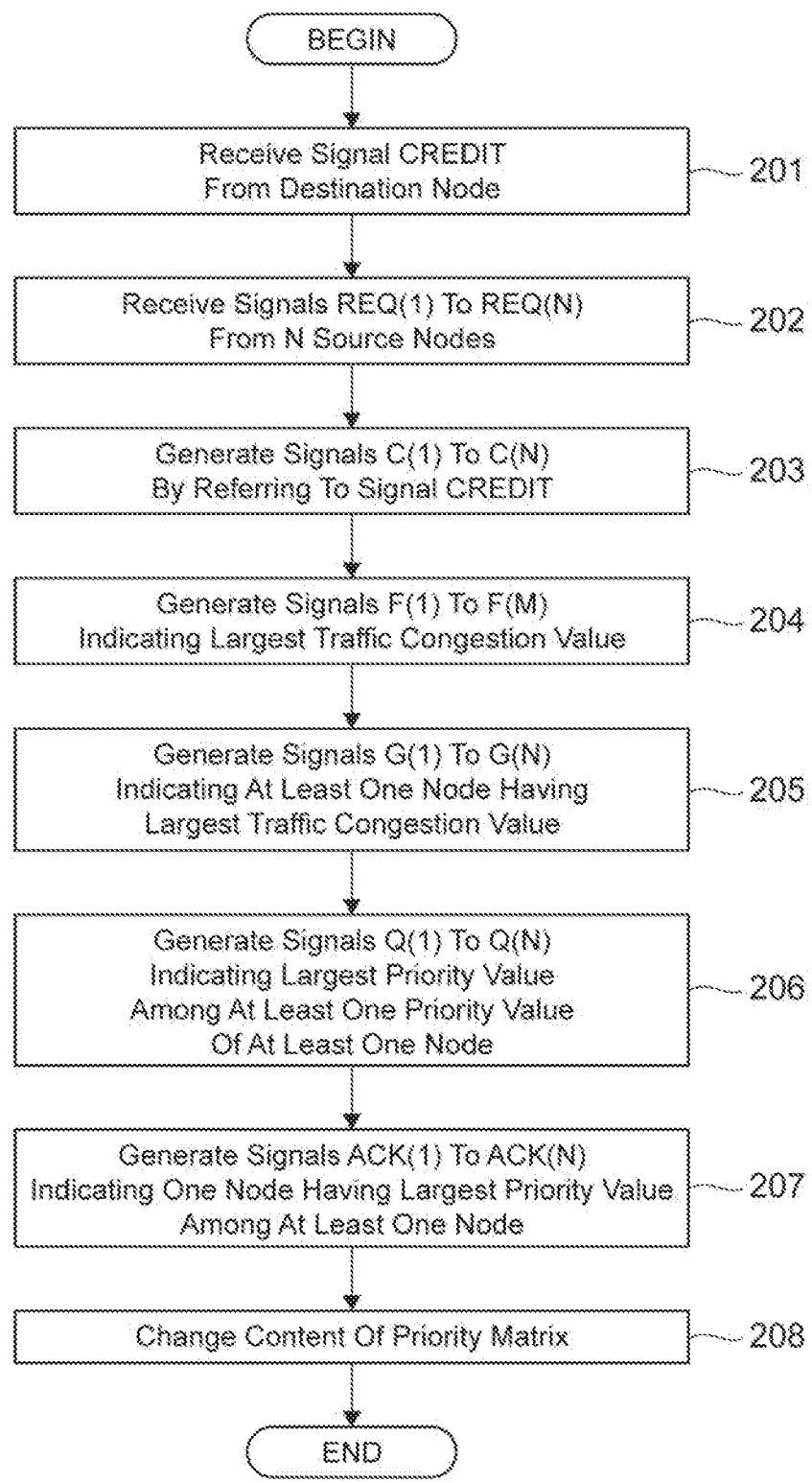
FIG. 8 depicts a block/flow diagram representing an example of a method performed by the arbiter according to an exemplary embodiment of the present invention.

Referring to FIG. 8, a block/flow representing an example of a method performed by the arbiter 20 is shown according to an exemplary embodiment.

First, the credit gate 21 may receive a signal CREDIT from a destination node (step 201). The credit gate 21 may receive signals REQ(1) to REQ(N) from N source nodes, namely a node #1 to a node #N (step 202). Then, the credit gate 21 may generate signals C(1) to C(N) by referring to the signal CREDIT (step 203). Specifically, credit gate 21 may generate signals C(1) to C(N) by activating at least one of the signals REQ(1) to REQ(N) which accompanies information on a packet size smaller than or equal to a credit value designated by the signal CREDIT.

Next, the traffic matrix 221 may generate signals F(1) to F(M) indicating, as a whole, the largest traffic congestion value (step 204). Then, the traffic matrix 222 may generate signals G(1) to G(N) indicating, as a whole, at least one node having the largest traffic congestion value (step 205).

Subsequently, the priority matrix 231 may generate signals Q(1) to Q(N) indicating, as a whole, the largest priority value among at least one priority value of the at least one node having the largest traffic congestion value (step 206). Then, the priority matrix 232 may generate signals ACK(1) to ACK(N) indicating, as a whole, one node having the largest priority value among the at least one node having the largest traffic congestion value (step 207). Finally, the priority matrix 231 (232) may change its content as shown in FIG. 7 (step 208).

In the foregoing description, before the priority matrixes 231 and 232 select one node from one or more nodes, the credit gate 21 and the traffic matrixes 221 and 222 are assumed to specify one or more nodes. Specifically, the credit gate 21 is assumed to specify nodes satisfying a condition that a size of data to be sent by each of the one or more nodes is smaller than or equal to a size of data which can be received by a data transfer destination. Further, the traffic matrixes 221 and 222 are assumed to specify nodes satisfying a condition that a level range of traffic congestion regarding each of the one or more nodes is the highest. However, the conditions for specifying the nodes are not limited to these. Any of predetermined conditions may be used as the conditions for specifying the nodes.

Next, an alternative exemplary embodiment will be described. The first alternative exemplary embodiment is different from the above exemplary embodiment only in a manner of the time transition of the priority matrix 231 (232).

In the first alternative exemplary embodiment, the priority matrix 231 (232) may change its content in the order different from that of FIG. 7 while using the matrix contents 2300 to 2311. For example, the priority matrix 231 (232) may change its content in the order of the matrix contents 2300, 2301, 2302, 2303, 2304, 2305, 2306, 2311, 2310, 2309, 2308, and 2307. The priority matrix 231 (232) may also change its content in the order of the matrix contents 2300, 2305, 2304, 2303, 2302, 2301, 2306, 2311, 2310, 2309, 2308, and 2307. Alternatively, the priority matrix 231 (232) may change its content in any random order.

Further, the priority matrix 231 (232) may use matrix contents different from those of FIG. 7 and change its content in any one of the abovementioned order. For example, the priority matrix 231 (232) may use a shuffled matrix content corresponding to the matrix content 2300 in which each of the priority values "1" to "6" is assigned to an arbitrary one of the nodes "#1" to "#6". In this case, the priority matrix 231 (232) may use a shuffled matrix content corresponding to the matrix content 2306 obtained by applying a left/right inversion to the shuffled matrix content corresponding to the matrix content 2300.

Subsequently, a second alternative exemplary embodiment will be described. The second alternative exemplary embodiment is different from the above exemplary embodiment only in a timing when the priority matrix 231 (232) changes its content.

As stated above, every time when the operation from receiving the signals REQ(1) to REQ(N) to sending the signals ACK(1) to ACK(N) is completed, the priority matrix 231 (232) is assumed to change its content, in the above described exemplary embodiment. In contrast, the priority matrix 231 (232) may change its content periodically, namely in response to elapse of a predetermined period of time, in the second alternative exemplary embodiment.

Next, a hardware configuration of each of the nodes 10 is described. Although assumed to be implemented with a processor in the foregoing description, each of the nodes 10 may be implemented with a computer 90 of FIG. 9. Thus, the description will be for the hardware configuration of the computer 90.

Figure 9:
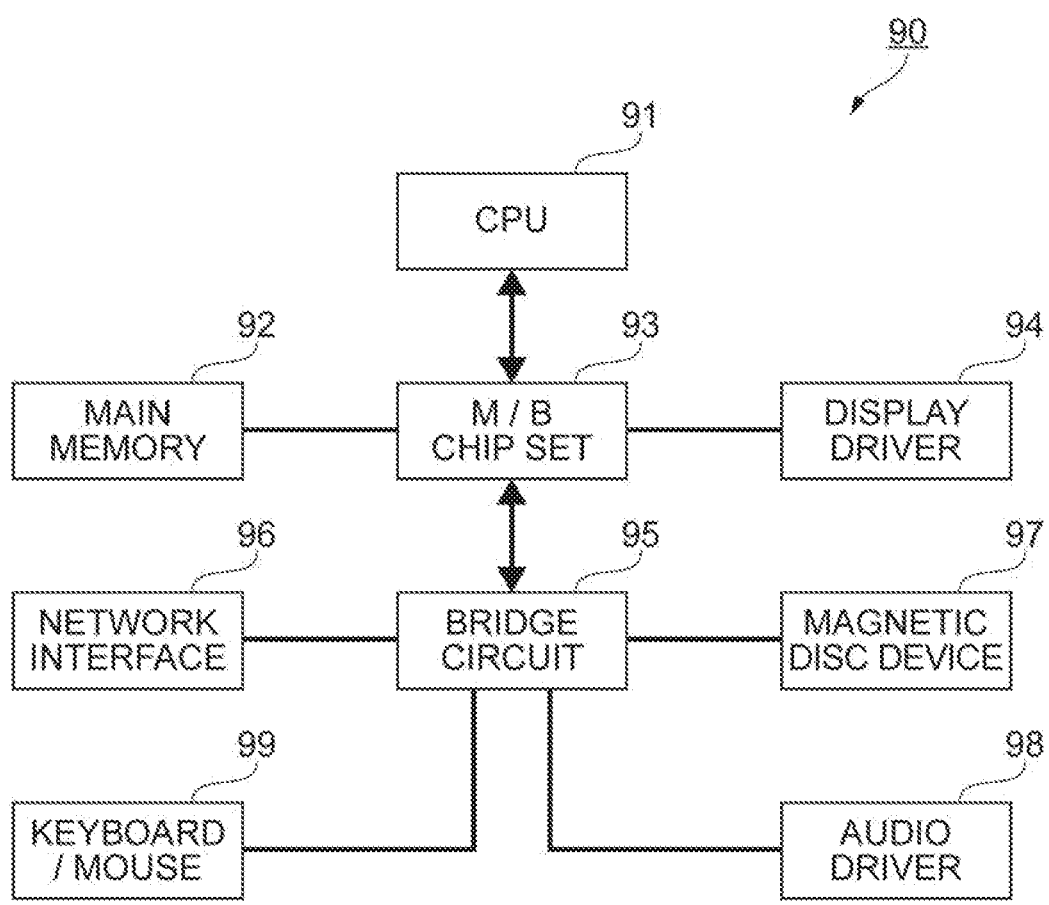
FIG. 9 depicts an example of a hardware configuration of a computer according to exemplary embodiments of the present invention.

Referring to FIG. 9, an example of a hardware configuration of the computer 90 is shown. As shown in FIG. 9, the computer 90 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 9, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for arbitrating data transfer requests from a plurality of nodes, the method comprising:
   identifying nodes satisfying a predetermined condition from among the plurality of nodes requesting to send data to a receiving node;
   assigning a plurality of priority values, the plurality of priority values arranged from high to low, to respective nodes of the plurality of nodes;
   sequentially rotating the plurality of priority values such that each value is assigned equally to each of the plurality of nodes, with the rotating going in a direction and changing to an opposite direction over time; and
   selecting a node having a highest priority value from among the nodes satisfying the predetermined condition as a sending node to transfer data to a receiving node among the plurality of nodes.

2. The method of claim 1, wherein the predetermined condition includes a condition that a size of data to be sent by each of the one or more nodes is smaller than or equal to a size of data which can be received by the receiving node of the plurality of nodes.

3. The method of claim 1, wherein the predetermined condition includes determining traffic congestion values of each of the plurality of nodes to identify the one or more nodes having the highest traffic congestion value among the plurality of nodes.

4. The method of claim 1, wherein:
   sequentially rotating further includes changing the association between a node of the plurality of nodes and a respective priority of the plurality of priority values such that a rotate direction of the plurality of priority values is in a forward direction for a first portion of time and in a reverse direction for a second portion of time.

5. The method of claim 1, wherein the plurality of priority values assigned to the respective nodes changes in response to completion of selecting the one node from the two or more nodes using the priority information.

6. The method of claim 1, wherein the plurality of priority values assigned to the respective nodes changes in response to elapse of a predetermined period of time.

7. An apparatus for arbitrating data transfer requests from a plurality of nodes, the apparatus comprising:
   a processor; and
   a memory coupled to the processor, wherein the memory comprises program instructions executable by the processor to cause the processor to:
   identify nodes satisfying a predetermined condition from among the plurality of nodes requesting to send data to a receiving node;
   assign a plurality of priority values, the plurality of priority values arranged from high to low, to respective nodes of the plurality of nodes;
   sequentially rotate the plurality of priority values such that each value is assigned equally to each of the plurality of nodes, with the rotating proceeding in a direction and changing to an opposite direction over time; and
   select a node having a highest priority value from among the nodes satisfying the predetermined condition as a sending node to transfer data to a receiving node among the plurality of nodes.

8. The apparatus of claim 7, wherein the predetermined condition includes a condition that a size of data to be sent by each of the one or more nodes is smaller than or equal to a size of data which can be received by the receiving node of the plurality of nodes.

9. The apparatus of claim 7, wherein the predetermined condition includes determining traffic congestion values of each of the plurality of nodes to identify the one or more nodes having the highest traffic congestion value among the plurality of nodes.

10. The apparatus of claim 7, wherein:
    the program instructions, causing the processor to sequentially rotate the plurality of priority values, further include changing the association between a node of the plurality of nodes and a respective priority of the plurality of priority values such that a rotate direction of the plurality of priority values is in a forward direction for a first portion of time and in a reverse direction for a second portion of time.

11. The apparatus of claim 7, wherein the plurality of priority values assigned to the respective nodes changes in response to completion of selecting the one node from the two or more nodes using the priority information.

12. The apparatus of claim 7, wherein the plurality of priority values assigned to the respective nodes changes in response to elapse of a predetermined period of time.

13. A computer program product for arbitrating data transfer requests from a plurality of nodes, the computer program product comprising a non-transitory computer readable storage medium having program instructions embodied therewith, the program instructions executable by a computer to cause the computer to:
    specify one or more specified nodes among the plurality of nodes requesting to send data to a receiving node, the one or more nodes satisfying a predetermined condition;
    assign priority information, implemented as priority values in a matrix and arranged from high to low, to the plurality of nodes, the priority information being an association between each of the plurality of nodes and one of a plurality of priorities, each column of the matrix representing a priority of the plurality of priorities;
    sequentially shift columns of the matrix so that each one of the plurality of priorities is assigned equally to each of the plurality of nodes, such that high and low priorities between pairs of priorities are equally assigned to a pair of nodes of the plurality of nodes; and select, from among the specified nodes satisfying the predetermined condition, one node having a highest priority information as a sending node to transfer data to a receiving node among the plurality of nodes.

14. The computer program product of claim 13, wherein the predetermined condition includes a condition that a size of data to be sent by each of the one or more nodes is smaller than or equal to a size of data which can be received by the receiving node of the plurality of nodes.

15. The computer program product of claim 13, wherein the predetermined condition includes determining traffic congestion values of each of the plurality of nodes to identify the one or more nodes having the highest traffic congestion value among the plurality of nodes.

16. The computer program product of claim 13, wherein: sequentially rotating further includes changing the association between a node of the plurality of nodes and a respective priority of the plurality of priority values such that a rotate direction of the plurality of priority values is in a forward direction for a first portion of time and in a reverse direction for a second portion of time.

17. The computer program product of claim 13, wherein the plurality of priority values assigned to the respective nodes changes in response to completion of selecting the one node from the two or more nodes using the priority information.

18. The computer program product of claim 13, wherein the plurality of priority values assigned to the respective nodes changes in response to elapse of a predetermined period of time.

* * * * *